United States Patent
Wu et al.

(10) Patent No.: US 8,234,526 B2
(45) Date of Patent: Jul. 31, 2012

(54) COMPUTER SYSTEM AND MONITORING DEVICE

(75) Inventors: Li Chien Wu, Taipei (TW); Pai Ching Huang, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 28 days.

(21) Appl. No.: 12/883,608

(22) Filed: Sep. 16, 2010

(65) Prior Publication Data

US 2011/0072314 A1 Mar. 24, 2011

(30) Foreign Application Priority Data

Sep. 18, 2009 (TW) .............................. 98131501 A

(51) Int. Cl.
*G06F 11/00* (2006.01)
(52) U.S. Cl. ............ 714/47.1; 714/37; 714/44; 714/45; 714/48
(58) Field of Classification Search ............... 714/37, 714/44, 45, 47.1, 48
See application file for complete search history.

(56) References Cited

U.S. PATENT DOCUMENTS

| | | | |
|---|---|---|---|
| 6,907,545 B2 * | 6/2005 | Ramadei et al. ............... 714/25 |
| 6,909,993 B2 | 6/2005 | Nakao et al. |
| 7,519,847 B2 * | 4/2009 | Sultenfuss et al. ........... 713/600 |
| 7,707,459 B2 * | 4/2010 | Glotzbach et al. ......... 714/38.11 |
| 7,721,153 B2 * | 5/2010 | Nash et al. ...................... 714/36 |
| 7,818,754 B2 * | 10/2010 | Morris et al. ................. 719/318 |
| 2006/0150021 A1 * | 7/2006 | Traskov et al. ................. 714/37 |
| 2006/0150158 A1 * | 7/2006 | Fellenstein et al. .......... 717/126 |
| 2007/0050683 A1 * | 3/2007 | Attinella et al. ............... 714/47 |
| 2007/0067678 A1 * | 3/2007 | Hosek et al. .................... 714/25 |
| 2007/0174716 A1 * | 7/2007 | Erdtmann et al. .............. 714/39 |
| 2008/0222612 A1 * | 9/2008 | Glotzbach et al. ............ 717/127 |
| 2009/0125758 A1 * | 5/2009 | Anuszczyk et al. ............ 714/48 |
| 2010/0088552 A1 * | 4/2010 | Kim et al. ....................... 714/47 |

FOREIGN PATENT DOCUMENTS

| | | |
|---|---|---|
| CN | 2566367 Y | 8/2003 |
| CN | 1445668 A | 10/2003 |
| CN | 1889053 A | 1/2007 |
| CN | 101075204 A | 11/2007 |
| CN | 101201766 A | 6/2008 |

* cited by examiner

*Primary Examiner* — Charles Ehne
(74) *Attorney, Agent, or Firm* — Muncy, Geissler, Olds & Lowe, PLLC

(57) ABSTRACT

A computer system and a monitoring device for a computer system are disclosed. The computer system includes a plurality of electronic modules, a memory module and an embedded controller. The embedded controller is coupled to the electronic modules and the memory module, respectively. The embedded controller collects information of the electronic modules and generates the system information about the electronic modules. The embedded controller selectively writes the system information into the memory module. The system information in the memory module can be provided to the user or the maintenance engineer for system analysis. Besides, the computer system may utilize an application program to monitor the system information, so as to achieve the error prevention and alert function.

15 Claims, 3 Drawing Sheets

COMPUTER SYSTEM AND MONITORING DEVICE

CROSS REFERENCE TO RELATED APPLICATIONS

This Non-provisional application claims priority under 35 U.S.C. §119(a) on Patent Application No(s). 098131501 filed in Taiwan, Republic of China on Sep. 18, 2009, the entire contents of which are hereby incorporated by reference.

BACKGROUND OF THE INVENTION

1. Field of Invention

The invention relates to a computer system, more particularly, to a monitoring device for monitoring and recording the system state of the computer system.

2. Related Art

At present, various kinds of computer systems are widely used in many occasions such as a government, a commercial office, a family or a personal occasion for storing or processing important information. Since the working time of the system becomes longer, or the user operates improperly, errors often come up, or the computer system needs maintenance.

Generally speaking, the computer system can remove the errors or restore through specific steps, and the manufacturers of the computer system provide the basic technology instructions or a service line to the users as a remote assistance. However, the computer system has large amounts of software and hardware. In order to determine the errors accurately and choose the right method, the operators must have some professional knowledge and practical maintenance experience in the computer system. It's not easy for common users to operate and make determination.

When the configuration of the computer system fails, the user usually needs to contact with the technician or the professional failure analysis engineer (FAE) via the Internet (such as an E-mail or an automatic electric report) or a telephone. Then, the maintenance process may be as follows.

First, the technician gets to know the problem from the remote end and requests the user to execute different application programs (such as a RS-232 console, telnet or other application programs with a text interface or a graphical user interface (GUI)). The user end collects the system information one by one according to the operating steps to feedback to the technician. The operating steps may include dozens of commands according to the complexity of the system. In some complicated occasions, according to the conditions or a contract, the technician needs go to the user end to collect the system information via the operating steps, or the user needs to send the product to the manufacturer by himself or herself.

Second, after the system information collection is finished, the technician analyzes the error according to the professional knowledge or the experience.

Then, the technician may update the firmware, change the system settings, restore the system default values or replace the components to maintain the computer system.

The conventional maintenance method above can be performed on the assumption that the computer system is on and can enter the operating system. However, if the computer system cannot enter the operating system normally due to some unclear reasons, the maintenance engineer cannot know whether the software and the hardware of the computer system are changed or not before the error occurs. Thus, it's harder to find the error cause, and the responsibility ownership is unclear.

The conventional method above needs the professional technicians with specific knowledge to operate or to routinely update the computer system to remove the errors. Thus, the manufacturer pays a higher cost, and the maintenance efficiency is low.

The invention provides a monitoring device for the computer system. The monitoring device uses a memory member as a black box of the computer system to record the information of the system operating process.

SUMMARY OF THE INVENTION

The invention provides a computer system including a central processing unit, a plurality of the electronic modules, a memory module and an embedded controller. The embedded controller is used to record the system information of computer hardware and records the system information into the memory module. As a result, the system information of the embodiment is provided to the user or the maintenance engineer to analyze the failure, increase the accuracy in determining the error cause and reduce the maintenance time. The application monitors the information such as the operating data of the application program to achieve the prevention and the alert function.

According to an embodiment, the electronic modules may include various electronic circuit components needed by the computer system. A central processing unit (CPU) is used for running an operating system program.

The embedded controller is coupled to the electronic modules and the memory module, respectively. The electronic modules collect the embedded controller and generate the system information of the electronic modules. The embedded controller records the collected system information into the memory module selectively.

In another aspect, the invention provides a monitoring device adapted for the computer system.

According to an embodiment, the monitoring device includes the memory module and the embedded controller. The embedded controller is coupled to a plurality of the electronic modules of the computer system and the memory module, respectively. The embedded controller collects the system information from the electronic modules and generates the system information relating to the electronic modules. The embedded controller records the collected system information into the memory module selectively.

Comparing to the conventional technology, the computer system and the monitoring device of the computer system in the invention use the embedded controller and the memory module as a black box monitoring system of the computer system, which is independent from the operating system program. When the computer system operates, the system information of the computer system is restored instantaneously or periodically to a read-only memory (ROM), which is used as a determination reference for the maintenance when the computer system is unmoral. Thus, it's convenient for the maintain technician, the maintenance efficiency is increased, and the probability of the man-made errors is decreased.

These and other features, aspects and advantages of the present invention will become better understood with regard to the following description, appended claims, and accompanying drawings.

DETAILED DESCRIPTION OF THE INVENTION

Figure 1:
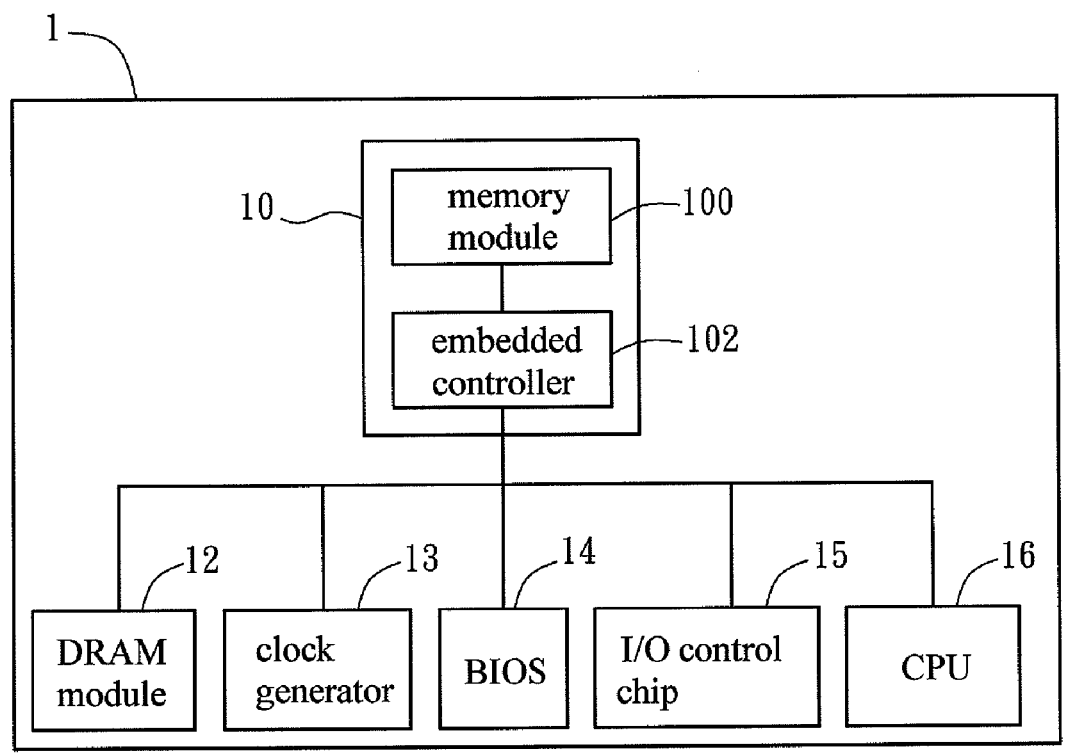
FIG. 1 is a function block diagram showing a computer system in an embodiment of the invention.

FIG. 1 is a flowchart showing a computer system 1 in one embodiment of the invention. The computer system 1 includes a monitoring module 10 and a plurality of the electronic modules. In the embodiment, the electronic modules may be a dynamic random access memory (DRAM) module 12, a clock generator 13, a basic input/output system (BIOS) 14, an input/output (I/O) control chip 15 and a central process unit (CPU) 16 or other electrical members needed by the computer system. The invention is not limited thereto.

As shown in FIG. 1, the monitoring module 10 includes a memory module 100 and an embedded controller 102. In the embodiment, the memory module 100 may use a read-only and non-volatile memory member. The feature of the memory is that each storage space only allows one writing action under the normal using state. The storage space can only be read after the information is written. Generally speaking, the memory is classified to a Read-Only Memory (ROM).

The monitoring module 10 may be cooperated with the computer system 1 in the embodiment, but the invention is not limited thereto. The monitoring module 10 itself can be a monitoring device. The monitoring device may be widely used in various computer systems.

In the application, the memory module 100 may also use an erasable and non-volatile memory. The erasable and non-volatile memory needs to be specially processed (such as using a high voltage) to erase the information for reuse. In general usage, the erasable and non-volatile memory still cannot be re-written.

In the embodiment, the computer system 1 includes an embedded controller 102. The embedded controller 102 may be a microprocessor or a single chip system circuit with a specific function. The embedded controller 102 is independent from the CPU 16 of the computer system 1. The embedded controller 102 is driven by a firmware program designed by the manufacturer and has some specific functions. The CPU 16 is usually used to execute an operating system program of the computer system 1 to achieve the general-purpose function of the computer system 1. In the embodiment, the firmware program executed by the embedded controller 102 also may be independent from the operating system program of the computer system 1. When the operating system program fails, crashes, cannot be booted or has other problems, the embedded controller 102 still can operate independently without the affection.

As shown in FIG. 1, the embedded controller 102 is coupled to the DRAM module 12, the clock generator 13, the BIOS 14, the I/O control chip 15, the CPU 16 and the memory module 100, respectively.

The embedded controller 102 collects the system information from the electronic modules and generates the system information relating to the electronic modules. In the embodiment, the system information may include information corresponding to many working statuses of the electronic modules. For example, the system information may include the memory module configuration information (such as the serial presence detect (SPD) configuration) from the DRAM module 12, the system operating frequency information from the clock generator 13, the system timing information and the initializing setting information from the BIOS 14, and the hardware monitoring information from the I/O control chip 15 (such as a super I/O control chip).

Then, the embedded controller 102 may selectively record the system information into the empty storage space of the memory module 100 after a determining process. The black box monitoring system of the computer system 1 is formed to store the system states of the computer system 1 to the read-only memory module 100. Thus, when the computer system 1 has problems, the maintenance engineer can refer to the system information of the memory module 100 to determine the error causes of the computer system 1, and even to determine whether the responsibility ownership is within the warranty scope of the contract or not.

The embedded controller 102 may be set to record the system information into the memory module 100 with a specific writing storing frequency, a specific writing time and a specific determination condition. For example, the embedded controller 102 may record all the collected system information to the memory module 100 instantaneously.

However, in practical applications, the storing capacity of the memory module 100 is limited, and the volume of the system information (such as the system time, the frequency, the temperature, the voltage, the speed of a fan, the hardware device) may be huge, especially, the parameters of the hardware devices are complicated. As a result, it's proper for the embedded controller 102 to collect and record the system information periodically or in a triggered mode. The monitoring period of the embedded controller 102 can be designed according to the storing capacity of the memory module 100 and the average volume of each of the system information.

Figure 2:
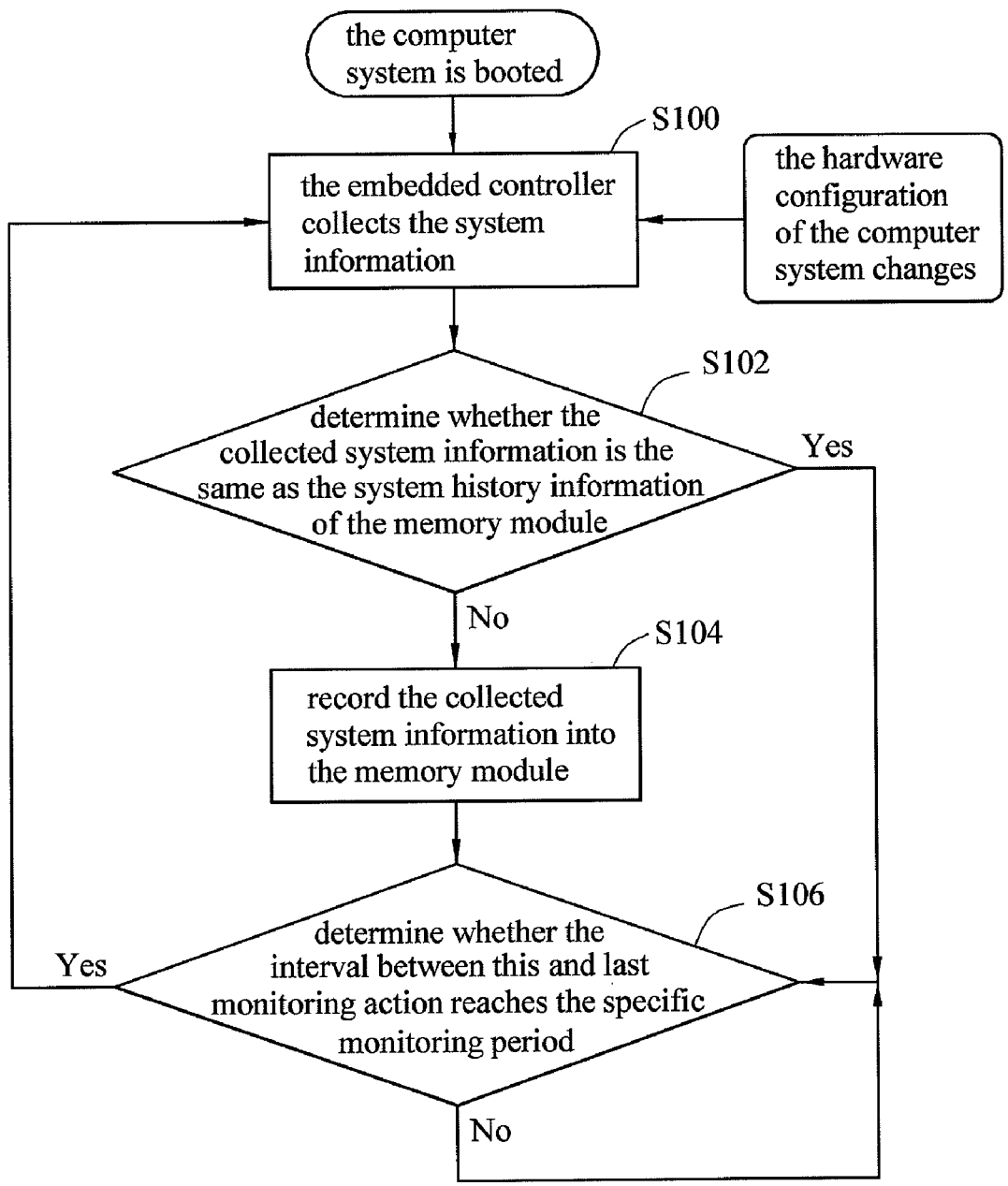
FIG. 2 is a flowchart showing the monitoring steps of a computer system and a monitoring module in an embodiment of the invention.

A following flow is taken as an example to explain the determination conditions of the computer system 1 and the monitoring module 10. FIG. 2 is a flowchart showing the monitoring steps executed by the computer system and the monitoring module in an embodiment of the invention.

As shown in FIG. 2, when the computer system is booted or the hardware configuration of the computer system changes, the monitoring module of the computer system executes the step S100 to collect the system information by the embedded controller.

At the time, the memory module prestores system history information. The system history information of the memory module may be pre-written system information or default comparing system information.

Next, the monitoring module executes the step S102 to determine whether the collected system information is the same as the system history information of the memory module or not. If not, the monitoring module executes the step S104 to record the collected system information into the memory module.

In practical applications, when the comparing result of the step S102 is unmatching, for example, the computer system may include the following states.

First, the electronic modules configuration of the computer system changes, for example, the user installs a new printer or inserts a disc, or some hardware devices are added into (for example, the new memories or discs are added) or removed from (for example, the old memories or discs are removed) the computer system.

Second, the operating state of the computer system changes abnormally and makes the system information different from the previous system history information. For example, a fan failure makes the temperature of a processor increase, or the circuit does not contact well to make the voltage supply unstable.

When the situations above or other abnormal situations make the system information different from the system history information, the embedded controller records the system information (such as the system time, the frequency, the temperature, the voltage, the speed of a fan, and the device in using) into the memory module. The system information in the invention can be provided to the user or the maintenance engineer of the computer system as a basis to analysis or remove errors.

For example, if the computer system is unnormal or cannot be booted due to a failure, the maintenance engineer can determine the reason and maintain it according to the system information of the memory module (a specific device is used to read the system information recorded in the memory module). Consequently, the determination accuracy is increased, and the maintenance time is decreased.

If the comparing result of the step S102 is matching, or the step S104 is finished, the monitoring module execute the step S106 to determine whether the interval between this and last monitoring action reaches the specific monitoring period or not. The length of the monitoring period relates to the storing capacity of the memory module and the information volume of the system information. When the step S106 determines that the monitoring period is reached, the monitoring module returns to execute the step S100. Thus, the embedded controller of the monitoring module collects and records the system information periodically according to the monitoring period.

In the above embodiment of the invention, a monitoring module can provide a basis for the user or the maintenance engineer to analysis the failure or remove errors, but the invention is not limited thereto. At the same time, the computer system can execute a specific application program via its processor, analyze, and monitor the system operating information (that is, the system information such as the system time, the frequency, the temperature, the voltage, the speed of a fan, and the device in using collected by the embedded controller) via the application program to achieve the prevention and alert function.

Figure 3:
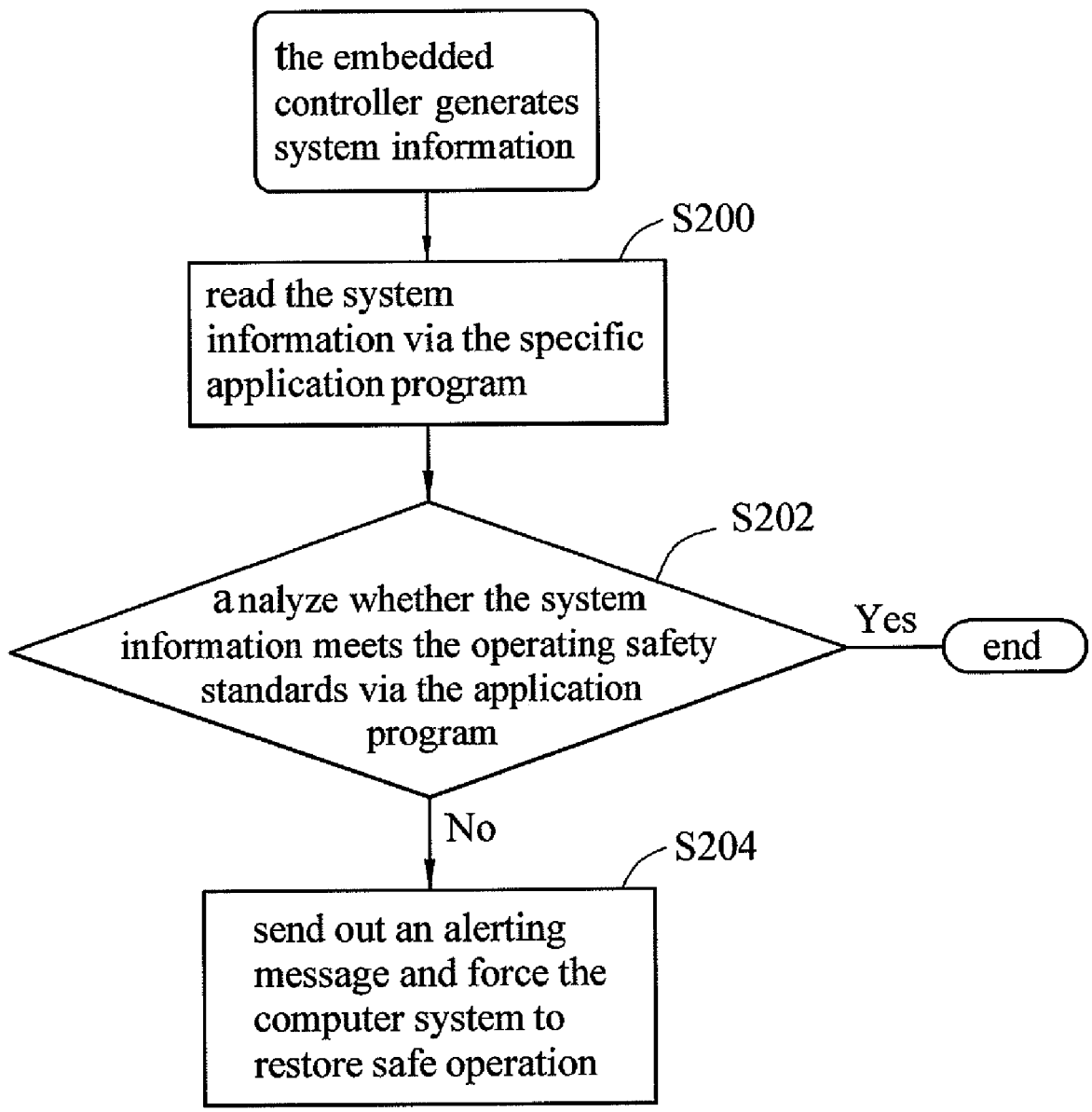
FIG. 3 is a flowchart showing prevention and alert steps of a computer system and a monitoring module in an embodiment of the invention.

FIG. 3 is a flowchart showing the prevention and alert steps executed by the computer system and the monitoring module in an embodiment of the invention.

As shown in FIG. 2 and the above embodiment, the embedded controller of the computer system in the invention collects and generates the system information at each interval of the monitoring period. In FIG. 3, the computer system may execute step S200 to read the system information from the memory module via the specific application program, or reads the system information directly via the embedded controller. Then, in step S202, whether the present state of the computer system meets the operating safety standards is analyzed and determined according to the system information. If the state of the computer system doesn't meet the operating safety standards, for example, the system temperature is too high or the time-frequency is abnormal, the step S204 is executed. An alerting message (such as a display alerting window or an alerting sound) is sent out, and the computer system is forced to restore safe operation. For example, some application software is forced to be closed, some hardware functions are stopped, or the system frequency is decreased.

The computer system and the monitoring device used in the computer system in the invention use the embedded controller and the memory module as a black box monitoring system of the computer system, which may be independent from the operating system program. When the computer system operates, the system information of the computer system is stored instantaneously or periodically to the ROM as a reference for the determination and the maintenance. Thus, it's convenient for the maintenance engineer, and the efficiency is increased, the probability of the man-made errors is decreased. The prevention and alert function can be achieved via the application program monitoring system operating information.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A computer system, comprising:
   a central processing unit (CPU) for running an operating system program;
   a plurality of electronic modules;
   a memory module; and
   an embedded controller coupled to the electronic modules, the CPU and the memory module, respectively;
   when the computer system is on, the embedded controller collects system information of the electronic modules, and the embedded controller records the system information into the memory module,
   wherein the embedded controller is driven by a firmware program to collect and record the system information and the firmware program is independent from the operating system program.

2. The computer system according to claim 1, wherein the memory module stores system history information, and after the embedded controller records the system information, the embedded controller records the system information into the memory module.

3. The computer system according to claim 1, wherein the embedded controller collects and records the system information instantaneously.

4. The computer system according to claim 1, wherein the embedded controller collects and records the system information periodically according to a monitoring period.

5. The computer system according to claim 1, wherein when the computer system is booted, or a hardware configuration of the computer system changes, the embedded controller collects and records the system information.

6. The computer system according to claim 1, wherein at least one of the electronic modules is a dynamic random access memory (DRAM) module, a clock generator, a basic input/output system (BIOS), or an input/output (I/O) control chip.

7. The computer system according to claim 6, wherein the system information comprises at least one of a memory module configuration information, a system operating frequency information, a system timing information, an initializing setting information and a hardware monitoring information.

8. The computer system according to claim 1, wherein the memory module is a non-volatile memory, and the memory module is a read-only memory (ROM) module.

9. The computer system according to claim 1, wherein all of the system information stored in the memory module forms a system operating history record corresponding to the computer system, and the system operating history record is used for helping to determine an error cause or a hardware updating history of the computer system.

10. A monitoring device applied to a computer system, comprising:
    a memory module; and an embedded controller coupled to a plurality of electronic modules and the memory module of the computer system, respectively, wherein the embedded controller collects a system information of the electronic modules via the electronic modules and records the system information into the memory module, wherein the embedded controller is driven by a firmware program to collect and record the system information and the firmware program is independent from the operating system program.

11. The monitoring device according to claim 10, wherein the memory module stores system history information, and after the embedded controller generates the system information, the embedded controller records the system information into the memory module.

12. The monitoring device according to claim 10, wherein the embedded controller collects and records the system information instantaneously.

13. The monitoring device according to claim 10, wherein the embedded controller collects and records the system information periodically according to a monitoring period.

14. The monitoring device according to claim 10, wherein when the computer system is booted or a hardware configuration of the computer system changes, the embedded controller collects and records the system information.

15. The monitoring device according to claim 10, wherein the memory module is a non-volatile memory and the memory module is a ROM module.

* * * * *